(12) United States Patent
Schmidt

(10) Patent No.: US 10,634,920 B2
(45) Date of Patent: Apr. 28, 2020

(54) SYSTEM AND METHOD FOR RECORDING AND REPRESENTING MEASUREMENT POINTS ON A BODY SURFACE

(71) Applicant: PRÜFTECHNIK Dieter Busch AG, Ismaning (DE)

(72) Inventor: Holger Schmidt, Unterföhring (DE)

(73) Assignee: PRÜFTECHNIK DIETER BUSCH AG, Ismaning (DE)

( * ) Notice: Subject to any disclaimer, the term of this patent is extended or adjusted under 35 U.S.C. 154(b) by 0 days.

(21) Appl. No.: 16/192,072

(22) Filed: Nov. 15, 2018

(65) Prior Publication Data

US 2019/0171015 A1 Jun. 6, 2019

(30) Foreign Application Priority Data

Dec. 1, 2017 (DE) .................. 10 2017 128 588

(51) Int. Cl.
*G01B 11/00* (2006.01)
*G02B 27/01* (2006.01)
(Continued)

(52) U.S. Cl.
CPC ........ *G02B 27/0172* (2013.01); *G01B 11/002* (2013.01); *G01B 11/03* (2013.01);
(Continued)

(58) Field of Classification Search
CPC ..... C11D 11/0017; C11D 11/02; C11D 17/06; C11D 1/02; C11D 1/12; C11D 1/24;
(Continued)

(56) References Cited

U.S. PATENT DOCUMENTS 9,298,266 B2 * 3/2016 Blackstone ............. G06F 3/017
9,857,589 B2 * 1/2018 Lundberg ................. G06K 9/48
(Continued)

FOREIGN PATENT DOCUMENTS

DE           103 19 369 A1    12/2004
DE     10 2008 020 771 A1     7/2009
(Continued)

OTHER PUBLICATIONS

European Search Report for EP18207699.2 dated May 6, 2019, European Patent Office.
(Continued)

*Primary Examiner* — Sunghee Y Gray
(74) *Attorney, Agent, or Firm* — Millman IP Inc.

(57) ABSTRACT

The invention relates to a system for recording and representing measurement points (M1, M2, . . . ) on a body surface, with a pair of smart glasses and a position measurement device. The pair of smart glasses has a head-up display and records one or two coordinates of each measurement point by means of a position sensor unit of the smart glasses, or, provided that one or two coordinates of a measurement point of the smart glasses is or are already known, represents graphically the position of the measurement point on the body surface in accordance with the known coordinate(s) by means of the head-up display. The position measurement device has a laser light source and an optical detector, which can be positioned at the respective measurement point on the body surface and includes a sensor surface for recording impingement points of the laser light of the laser light source.

14 Claims, 2 Drawing Sheets

Figure 1:
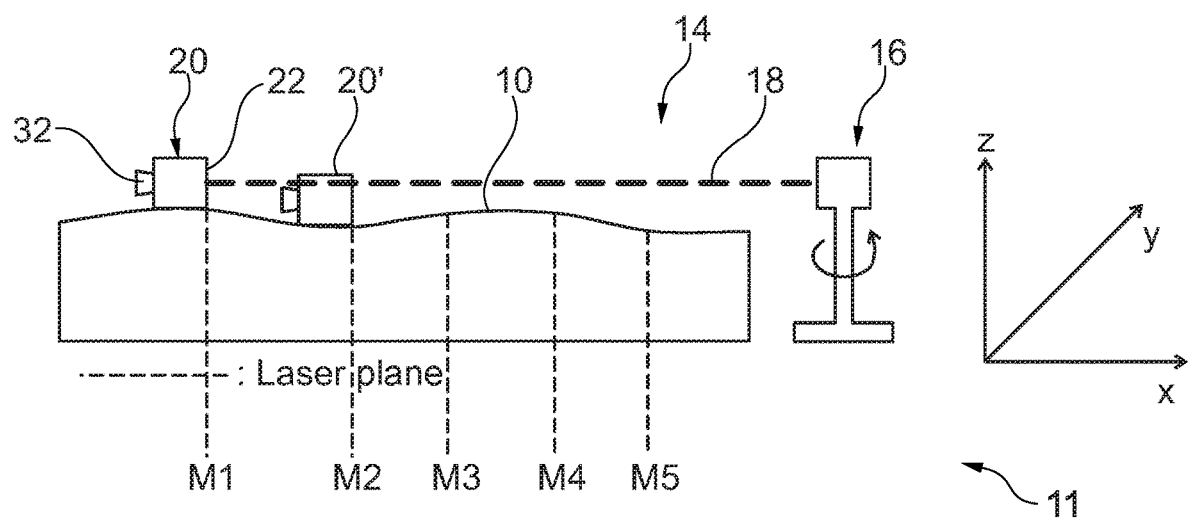
Figure 1:
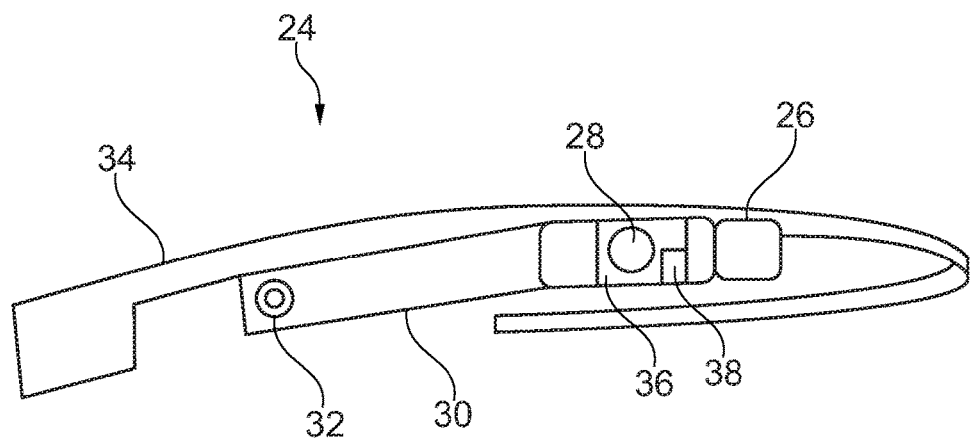

(51) Int. Cl.

| | | |
|---|---|---|
| *G01B 11/24* | (2006.01) | |
| *G01B 11/14* | (2006.01) | |
| *G01B 11/03* | (2006.01) | |
| *G01S 17/42* | (2006.01) | |
| *G06F 3/01* | (2006.01) | |
| *G06F 3/03* | (2006.01) | |
| *G06T 11/60* | (2006.01) | |
| *G06T 19/00* | (2011.01) | |

(52) U.S. Cl.
CPC .............. *G01B 11/14* (2013.01); *G01B 11/24* (2013.01); *G01S 17/42* (2013.01); *G06F 3/014* (2013.01); *G06F 3/0304* (2013.01); *G06T 11/60* (2013.01); *G06T 19/006* (2013.01); *G02B 2027/014* (2013.01); *G02B 2027/0138* (2013.01); *G02B 2027/0178* (2013.01); *G06T 2207/30204* (2013.01)

(58) Field of Classification Search
CPC ........... C11D 1/75; C11D 1/83; C11D 3/0047; C11D 3/122; C11D 3/124; C11D 3/128; C11D 3/2075; C11D 3/2086; C11D 3/2093; C11D 3/225; C11D 3/26; C11D 3/30; C11D 3/33; C11D 3/3418; C11D 3/3481; C11D 3/349; C11D 3/3707; C11D 3/3715; C11D 3/3723; C11D 3/3746; C11D 3/3757; C11D 3/38609; C11D 3/38627; C11D 3/3942; C11D 3/42; C11D 3/50; G01B 11/002; G01B 11/03; G01B 11/14; G01B 11/24; G01S 17/42; G02B 2027/0138; G02B 2027/014; G02B 2027/0178; G02B 27/0172; G06F 3/014; G06F 3/0304; G06T 11/60; G06T 19/006; G06T 2207/30204
USPC .................................................. 356/614–625
See application file for complete search history.

(56) References Cited

U.S. PATENT DOCUMENTS

| | | | | |
|---|---|---|---|---|
| 10,114,465 | B2* | 10/2018 | Wan .................. | G06F 3/011 |
| 10,248,855 | B2* | 4/2019 | Lin .................... | G06K 9/00355 |
| 2010/0253494 | A1* | 10/2010 | Inoue ................. | G01C 21/36 |
| | | | | 340/436 |
| 2015/0062003 | A1* | 3/2015 | Rafii .................. | G06F 3/017 |
| | | | | 345/156 |
| 2015/0373321 | A1 | 12/2015 | Bridges | |
| 2019/0208979 | A1* | 7/2019 | Bassa ................. | A47L 11/4038 |

FOREIGN PATENT DOCUMENTS

| | | | |
|---|---|---|---|
| DE | 10 2008 020 772 | A1 | 10/2009 |
| DE | 10 2015 201 290 | A1 | 7/2016 |
| EP | 2 916 099 | A1 | 9/2015 |
| EP | 2 998 694 | A9 | 4/2016 |
| WO | 2014/014786 | A1 | 1/2014 |
| WO | 2016/085682 | A1 | 6/2016 |

OTHER PUBLICATIONS

German Search Report for DE Application No. 102017128588.1 dated Aug. 13, 2018.

* cited by examiner

SYSTEM AND METHOD FOR RECORDING AND REPRESENTING MEASUREMENT POINTS ON A BODY SURFACE

The invention relates to a system and method for recording and representing measurement points on a body surface.

The geometric measurement of body surfaces can serve, for example, for the purpose of evaluating measurement points on the body surface in regard to their position with respect to a reference point, a reference line, or a reference plane inside of or outside of the body. For example, points of the body surface can be analyzed in regard to their planarity relative to a reference plane.

Described in EP 2 998 694 A9 is a method for determining the 3D coordinates of an object by means of a 3D measurement device, wherein the 3D measurement device is connected to a pair of smart glasses, which serves to present to the user data relating to the 3D coordinate measurement by means of a display, wherein the data can be superimposed on images or videos recorded by the smart glasses, in order to make possible an "augmented reality" representation.

Described in EP 2 916 099 A1 is a similar system, in which the recording of the 3D coordinates is produced by means of an articulated arm, and results are represented by means of a pair of smart glasses.

Described in WO 2014/014786 A1 is a system that projects data directly onto a surface of a body in order to obtain an augmented reality function.

Described in DE 10 2008 020 771 A1 is a method for determining deviations between a target state and an actual state of a workpiece, wherein corresponding data are represented on the workpiece in correct position by means of a pair of smart glasses, and wherein the position and viewing direction of the user who is wearing the smart glasses can be recorded by means of a tracking sensor integrated in the smart glasses.

Described in DE 10 2008 020 772 A1 is a similar method, wherein the pair of smart glasses is designed to identify predefined gestures of the user in order to select, on the basis of the recorded gestures, the measurement results to be represented.

Described in WO 2016/085682 A1 is a pair of smart glasses that determines 3D coordinates of bodies, such as, for example, pieces of furniture, and then calculates distances, surfaces, or volumes between points on the body surfaces.

DE 10 2015 201 290 A1 relates to a method for aligning two bodies with respect to each other by means of a laser alignment system and a pair of smart glasses connected thereto, which has a head-up display ("HUD") in order to represent to the user information that is helpful in carrying out the alignment operation, including measurement results relative to the alignment.

The object of the present invention is to create a system and a method that make possible the recording and representation of measurement points on a body surface in an especially efficient way.

In accordance with the invention, this object is achieved by a system according to claim 1 as well as a method according to claim 14.

In the solution according to the invention, a portion of the coordinates of each measurement point is recorded by means of a pair of smart glasses or, provided it is already known, specified to the user in a convenient way, whereas the remaining portion of the coordinates of each measurement point is determined by means of a position measurement device, wherein, by means of the smart glasses, a result derived from the portion of the coordinates recorded for each measurement point by means of the position measurement device is represented graphically on the body surface at the position of the respective measurement point. Because the recording of the coordinates can be produced with relatively high accuracy by means of the position measurement device and in a relatively simple manner by means of the smart glasses, the portion of the coordinates for which a high accuracy is not required can be recorded or specified in a fast and convenient way by means of the smart glasses, whereas the portion of the coordinates that is to be used for the result of interest can be determined with high accuracy by means of the position measurement device. The pair of smart glasses further ensures a clear, convenient, and efficient representation of the results.

Preferably, the pair of smart glasses is used to record or graphically specify the two horizontal coordinates, whereas the position measurement device is used to record the vertical coordinates.

Further preferred embodiments of the invention ensue from the dependent claims.

Figure 2:
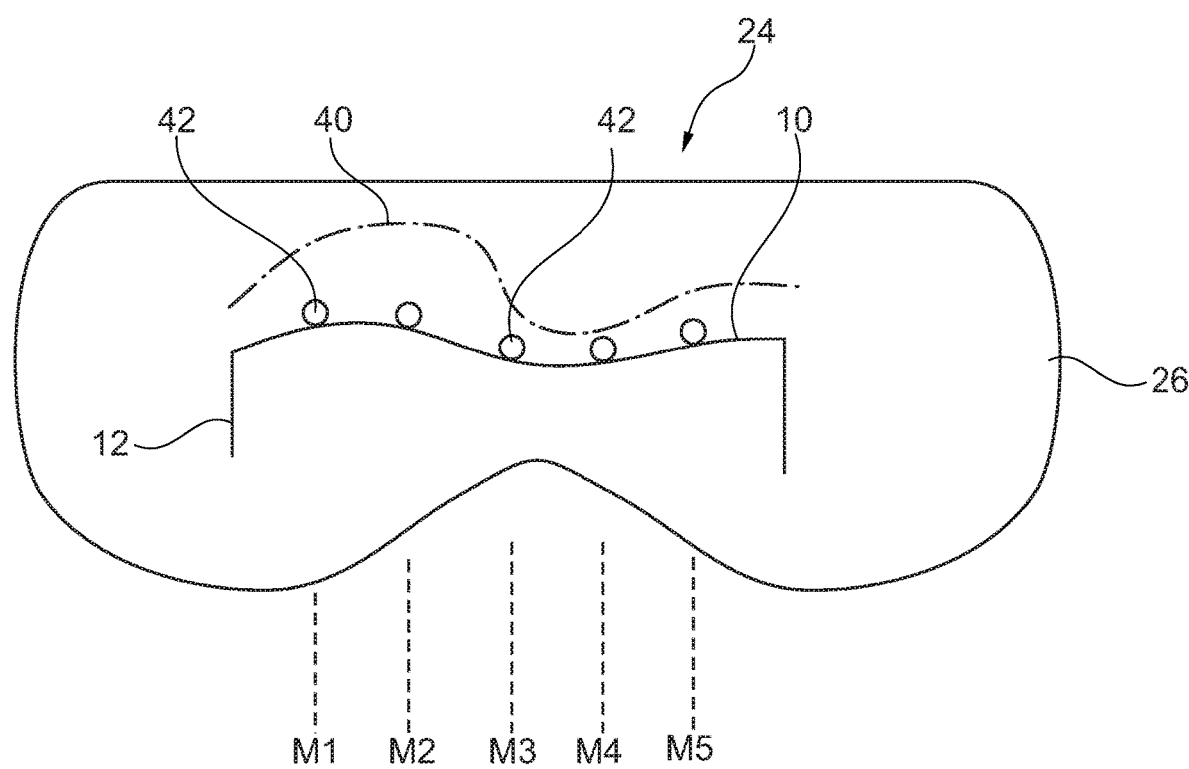

The invention will be explained in detail below on the basis of the appended drawings by way of example; shown herein are:

FIG. 1, a schematic representation of an example of a system according to the invention for the measurement of a body; and FIG. 2, a schematic representation of an example of what is presented on the display of the smart glasses of the system of FIG. 1.

Shown schematically in FIG. 1 is an example of a system 11 for recording and representing geometric properties of measurement points on a surface 10 of a body 12. The system has an optical position measurement device 14, which comprises a laser light source 16 for emitting a laser beam 18 as well as an optical detector 20 with a sensor surface 22 for recording the points of impingement of the laser light 18 of the laser light source 16. The system further includes a pair of smart glasses 24 with a head-up display 26, a camera 28, and a processor 30 as well as a wireless interface 32, wherein these components are borne by a frame 34. The wireless interface 32 serves for wireless connection to the detector 20 of the position measurement device 14, which also has such an interface 32. The interfaces 32 can be designed, for example, as Bluetooth interfaces. The pair of smart glasses 24 further has a position sensor unit 36, which can comprise, in addition to the camera 28, additional sensors, such as, for example, at least one acceleration sensor and/or at least one rotation rate sensor (such additional sensors are shown in FIG. 1 by reference 38).

The system of FIG. 1 serves to record the x, y, and z coordinates at a plurality of measurement points M1, M2, . . . on the body surface 10, and to represent a result derived from at least one coordinate (typically the z coordinate) by means of the smart glasses 24 at the position of the respective measurement point on the body surface 10. A portion of the coordinates (e.g., x and y) of each measurement point is recorded by means of the smart glasses 24, or, provided that these coordinates are already known or specified, represented graphically or specified to the user by means of the smart glasses 24 at the position of the measurement point on the body surface 10, whereas the remaining portion of the coordinates (e.g., the z coordinate) is determined by means of the optical position measurement device 14. Typically, the pair of smart glasses 24 is used to record or graphically specify the two horizontal coordinates x and y, whereas the optical position measurement device 14 is used to record the vertical coordinate, that is, the z coordinate.

Provided that the x and y coordinates of a measurement point are not known to the smart glasses 24, the pair of smart glasses 24 determines, by means of the position sensor unit 36, the x and y coordinates of the current measurement point, that is, the point at which the user has positioned the optical detector 20 (in the example of FIG. 1, this would be the measurement point M1). This determination of the x and y coordinates of the measurement point can be produced in a way that is known as such in that the pair of smart glasses 24 records its own position and orientation in space as well as the distance to the current measurement point (here M1). The distance measurement can occur, for example, by analysis of the visual deformation of a grid pattern projected onto the body surfaces; the recording of the position and orientation of the smart glasses can be produced by acceleration and/or rotation rate sensors. Examples of the recording of the coordinates of an object by means of a pair of smart glasses are described, for example, in WO 2016/085682 A2.

Provided that the pair of smart glasses 24 already knows the x and y coordinates of the current measurement point (for example, when the measurement points are specified externally on the basis of a specific diagram), the pair of smart glasses 24 then graphically represents the position of the measurement point corresponding to the specified coordinates of the body surface 10 to the user by means of the head-up display 26, so that the user knows at which position the optical detector 20 is to be placed on the body surface 10. This can be done in a way that is known as such in the form of an "augmented reality" representation by use of the camera 28. In this case, the representation of the position of the measurement point can be produced, for example, by using virtual 3D or 2D markup objects (indicated in FIG. 2 by reference 42) on the body surface 10. In this case, it is possible, for example, to overlay cubes or spheres or a grid or small crosses at the corresponding position on the body surface 10. The representation of the x and y positions of the measurement point on the body surface 10 is thus produced in such a way that the user of the smart glasses perceives this position as lying on the body surface—for example, by overlaying markings at this position.

Once the optical detector 20 has been placed at the desired measurement point, a measurement of the z coordinate of the measurement point is produced by means of the laser beam 18. For this purpose, the points of impingement of the laser beam 18 on the detector surface 22 are recorded in a way that is known as such, from which, in a way that is known as such, the z coordinate of the corresponding measurement point can be determined (in this case, a known offset is essentially included in the determination and corresponds to the distance between a reference point or a horizontal reference line on the detector surface and the point of placement of the detector on the body surface). In this case, the laser beam 18 can establish, for example, a horizontal laser plane by correspondingly rotating the laser light source 16, so that the relative z coordinate of the measurement point resulting, via the offset, from the vertical components of the point of impingement of the measurement point indicates the position relative to the horizontal plane specified by the laser beam 18.

The detector 20 transmits the data relating to the points of impingement of the laser beam 18 (or the already determined corresponding z coordinate) via the interfaces 32 to the smart glasses 24, where the processor 30 then serves as an analysis unit in order to derive a result for the measurement point from the determined z coordinate. What is involved here can be, for example, the amount and/or the direction of the deviation from a specified target value.

This procedural approach is then repeated for the other measurement points provided (in FIG. 1, the optical detector is indicated, for example, at the measurement point M2 by 20').

The results for the individual measurement points are graphically represented to the user by means of the head-up display 26. This can be produced, for example, as indicated in FIG. 2, on the basis of a profile 40, which is typically illustrated in an overlaid manner in order to represent even small deviations to the user in a clearly perceivable manner. In this case, each result value is projected onto the position of the corresponding measurement point, as indicated in FIG. 2. Alternatively or additionally, the representation can be produced by way of color coding; that is, the color of the representation at the corresponding measurement point on the body surface 10 depends on the result determined for this measurement point (this can be, for example, the deviation of the z coordinate from a specified target value). It is fundamentally possible for the results to be divided into classes, with the individual classes then being graphically represented differently, such as, for example, by means of different colors. For example, red regions of the body surface 10 can indicate that an unacceptably large deviation from the target value is present there, whereas green regions can mean that the tolerances of the deviation are adhered to there.

The invention claimed is:

1. A system for recording and representing measurement points (M1, M2, . . . ) on a surface of a body, with a pair of smart glasses and a position measurement device,
    wherein the pair of smart glasses has a head-up display and is designed to record one or two coordinates of each measurement point by means of a position sensor unit of the smart glasses or, provided that one or two coordinates of a measurement point of the smart glasses is or are already known, to represent graphically to the user the position of the measurement point on the body surface in accordance with the known coordinate(s) by means of the head-up display,
    wherein the position measurement device has a laser light source and an optical detector, which can be positioned at the respective measurement point on the body surface and which has a sensor surface for recording the points of impingement of the laser light of the laser light source, in order to determine the coordinate(s) of each measurement point that have not yet been recorded, and
    wherein the pair of smart glasses is designed to represent graphically, by means of the head-up display, a result derived from the coordinate(s) for each measurement point recorded by means of the position measurement device at the position of the respective measurement point on the body surface.

2. The system according to claim 1, further characterized in that the pair of smart glasses is designed to record or graphically represent two coordinates, wherein the position measurement device is designed to record only the third coordinate.

3. The system according to claim 2, further characterized in that the pair of smart glasses is designed to record or graphically represent both horizontal coordinates, wherein the position measurement device is designed to record only the vertical coordinate.

4. The system according to claim 1, further characterized in that the result involves the amount and/or the direction of the deviation from a specified target value.

5. The system according to claim 1, further characterized in that the pair of smart glasses is designed to divide the results into classes and to represent the classes graphically in different manner.

6. The system according to claim 5, further characterized in that the pair of smart glasses is designed to represent the results in a color-coded manner.

7. The system according to claim 1, further characterized in that the pair of smart glasses is designed to represent graphically to the user the position of the measurement point corresponding to the known coordinate(s) by means of overlaid virtual 3D or 2D markup objects on the body surface.

8. The system according to claim 1, further characterized in that the derivation of the results is produced in a analysis unit of the smart glasses.

9. The system according to claim 1, further characterized in that the pair of smart glasses and the position measurement device each have a wireless interface in order to communicate via a wireless connection.

10. The system according to claim 1, further characterized in that the position sensor unit of the smart glasses is designed to record the measurement point coordinate(s), in that the pair of smart glasses records its own position and orientation in space as well as the distance to the respective measurement point.

11. The system according to claim 10, further characterized in that the position sensor unit of the smart glasses is designed to record the distance to the respective measurement point, in that the visual deformation of a grid pattern projected onto the body surface is analyzed.

12. The system according to claim 10, further characterized in that the position sensor unit of the smart glasses has a camera, at least one acceleration sensor, and/or at least one rotation rate sensor in order to record position and orientation of the smart glasses in space.

13. The system according to claim 1, further characterized in that the position measurement device is designed to establish a horizontal laser plane by means of the laser beam and to record the vertical measurement point coordinate of each measurement point relative to the laser plane on the basis of the points of impingement of the laser beam on the sensor surface.

14. A method for recording and representing measurement points on a surface of a body by using a pair of smart glasses with a head-up display and a position measurement device with a laser light source and an optical detector, which can be positioned at the respective measurement point on the body surface and which has a sensor surface for recording the points of impingement of the laser light of the laser light source, wherein one or two coordinates of each measurement point is or are recorded by means of a position sensor unit of the smart glasses or, provided that one or two coordinates of a measurement point of the smart glasses is or are already known, the position of the measurement point is graphically represented on the body surface to the user in accordance with the known coordinate(s) by means of the head-up display;

the optical detector is positioned at the respective measurement point on the body surface, and the coordinate(s) of the measurement point that have not yet been recorded is or are determined on the basis of the point of impingement or the points of impingement of the laser light on the sensor surface; and a result is derived from the coordinate(s) for each measurement point that is or are recorded by means of the position measurement device, and is graphically represented to the user by means of the smart glasses at the position of the respective measurement point on the body surface.

* * * * *